United States Patent Office 3,639,435
Patented Feb. 1, 1972

3,639,435
3-OXYGENATED 21β-HYDROCARBONSULFONYL-5α-PREGNA-17(20),20-DIENES AND 1,3,5(10)-TRIS-DEHYDRO 19 - NOR DERIVATIVES CORRESPONDING
Walter R. Benn, Deerfield, Ill., assignor to
G. D. Searle & Co., Chicago, Ill.
No Drawing. Continuation-in-part of application Ser. No. 773,273, Nov. 4, 1968. This application Dec. 22, 1969, Ser. No. 887,426
Int. Cl. C07c *169/08, 169/20*
U.S. Cl. 260—397.5     11 Claims

ABSTRACT OF THE DISCLOSURE 3-oxygenated 21β - hydrocarbonsulfonyl-5α-pregna-17 (20),20-dienes and 1,3,5(10)-trisdehydro 19-nor derivatives corresponding possessing anti-microbial, e.g. antiprotozoal, properties are prepared by contacting the corresponding 17α-ethynyl-17β-hydroxy starting material with the appropriate hydrocarbonsulfinyl halide and subjecting the resulting 17-hydrocarbonsulfinate ester to heating at elevated temperature.

---

This application is a continuation-in-part of my copending application Ser. No. 773,273, filed Nov. 4, 1968, now U.S. Pat. No. 3,499,013.

The present invention relates to novel steroidal derivatives characterized by a $\Delta^{17(20),2}$-dienic system and a 21-hydrocarbonsulfonyl group and, more particularly, to 3-oxygenated 21β - hydrocarbonsulfonyl-5α-pregna-17 (20),-20-dienes and 1,3,5(10)-trisdehydro 19-nor derivatives corresponding. The instant compounds are depicted by the following structural formula

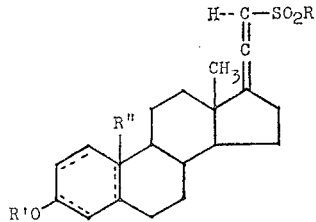

in which R is a lower alkyl, phenyl or lower alkyl (phenyl) radical, R' is hydrogen or a lower alkyl or a lower alkanoyl radical, the dotted lines indicate either a saturated or $\Delta^{1,3,5(10)}$-trienoic A-ring and R" is a methyl radical when the A-ring is saturated.

The lower alkyl radicals represented in that formula are typified by methyl, ethyl, propyl, butyl, pentyl, hexyl, heptyl and the corresponding isomeric branched-chain radicals.

Typical of the lower alkanoyl radicals encompassed by that structural representation are formyl, acetyl, propionyl, butyryl, valeryl, caproyl, heptanoyl and the branched-chain isomers thereof.

The instant 21-hydrocarbonsulfonyl compounds are useful in view of their valuable pharmacological properties. They are, for example, anti-microbial agents as is evidenced by their ability to inhibit the growth of protozoa such as *Trichomonas vaginalis*. That property is evidenced by the activity displayed by representative compounds, e.g. 21β-p-tolylsulfonyl-19-norpregna-1,3,5 (10)-,17(20),20-pentaen-3-ol, 21β - methanesulfonyl-19-norpregna-1,3,5(10),17(20),20-pentaen-3-ol acetate, 21β-methanesulfonyl - 19 - norpregna-1,3,5(10),17(20),20-pentane-3-ol, 21β - methanesulfonyl-19-norpregna-1,3,5 (10),17(20),20-pentaen-3-ol methyl ether and 21β-p-tolylsulfonyl-5α-pregna-17(20),20-dien-3-ol acetate when tested in the following assay:

To 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water, adjusting the pH to 6.8 with 4% aqueous sodium hydroxide, incorporating 30 parts of agar (Baltimore Biological Laboratories), boiling for 1 minute to dissolve the agar, and sterilizing in an autoclave, is added aseptically 20 volumes of sterile Dubos medium serum. The resulting medium is inoculated with 1% by volume of a 72-hour culture of *Trichomonas vaginalis*, whereupon 1 ml. of the inoculated medium is mixed with 10 mg. of test compound. The mixture is incubated anaerobically at 37° C. for 48 hours, then is examined microscopically for the presence of motile trichomonads. If any are observed, the compound is considered active. If no motile trichomonads are observed, 0.1 ml. of the incubated mixture is serially diluted and mixed with additional quantities of the inoculated medium sufficient to produce concentrations of 1000, 100, 10 and 1 mcg. of test compound per ml. and the resulting mixtures are inoculated anaerobically as before at 37° C. for 48 hours, then are examined microscopically for the presence of motile trichomonads. Controls are provided by concurrent incubations identical with the foregoing except for the absence of the test compound.

The compounds of this invention are conveniently manufactured by processes utilizing as starting materials 17α-ethynyl-17β-hydroxy steroids encompassed by the following structural formula

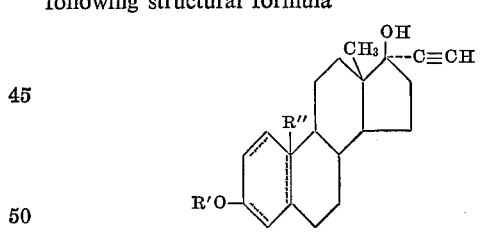

wherein R', R" and the dotted lines have the same meanings as defined hereinbefore. The first step of a suitable process involves the conversion of such a starting material to the corresponding 17-hydrocarbonsulfinate ester. Those intermediate esters are heated at high temperature to effect rearrangement of the groups at the 17-position, thus affording the $\Delta^{17(20),20}$ compounds. A typical example of that two-step process is the reaction of 17α-ethynylestra-1,3,-5(10)-triene-3,17β-diol 3-methyl ether with methanesulfinyl chloride to afford the corresponding 17-methanesulfinate, which is heated in chlorobenzene solution at the reflux temperature to yield 21β-methanesulfonyl-19-norpregna-1,3,5(10),17(20),20-pentaen-3-ol methyl ether.

Other high boiling solvents such xylene are also suitable in the latter procedure.

The instant novel intermediate sulfinate esters exists as mixtures of the two possible enantiomers and are conveniently described as the R and S isomers in accordance with the system described by Cahn, Journal of Chemical Education, 41, 116 (1964). This type of stereoisomerism about the sulfur atom is represented by the following partial formulas

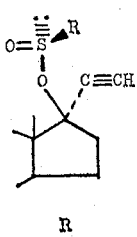   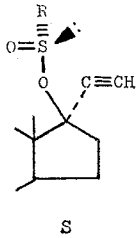

R          S

Hydrolysis of the instant 3-(lower alkanoyl)oxy compounds is a preferred method for producing the corresponding 3-hydroxy compounds. 21β-methanesulfonyl-19-norpregna-1,3,5(10),17(20),20-pentaen-3-ol acetate is thus heated with sodium carbonate in aqueous methanol to produce 21β-methanesulfonyl-19-norpregna-1,3,5(10), 17(20),20-pentaen-3-ol.

The invention will appear more fully from the examples which follow. These examples are given by way of illustration only and are not to be construed as limiting the invention either in spirit or in scope as many modifications both in materials and in methods will be apparent to those skilled in the art. In these examples, temperatures are given in degrees centigrade (° C.) and quantities of materials in parts by weight except where otherwise noted.

EXAMPLE 1

A solution containing 13.9 parts of 17α-ethynyl-5α-androstane-3β,17β-diol 3-acetate, 20 parts of pyridine and 267 parts of methylene chloride is cooled by means of an ice-salt bath and 10.5 parts of p-toluenesulfinyl chloride is added dropwise with stirring over a period of about 30 minutes. Stirring of the mixture at that temperature is continued for about 6 hours, at the end of which time it is diluted with methylene chloride. The resulting organic solution is washed successively with cold dilute hydrochloric acid, water, cold dilute aqueous sodium bicarbonate and saturated aqueous sodium chloride, then is dried over anhydrous sodium sulfate and concentrated under reduced pressure to afford a pale yellow solid residue. Purification of that crude product by recrystallization from ethyl acetatehexane affords pure 17α-ethynyl-5α-androstane-3β,17β-diol acetate, 17 - p - toluenesulfinate, melting at about 161–165°. This compound exhibits infrared absorption peaks at about 3.00, 5.78, 7.95 and 8.82 microns and nuclear magnetic resonance maxima at about 49.5, 53, 121, 145, 176.5, 178.5, 281 and 447 cycles per second. It is represented by the following structural formula

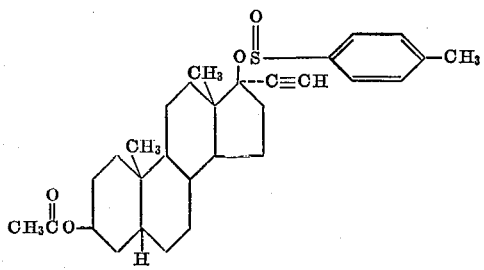

EXAMPLE 2

By the substitution of an equivalent quantity of 17α-ethyl-5α-androstane-3β,17β-diol 3-propionate in the procedure of Example 1, there is produced 17α-ethynyl-5α-androstane-3β,17β-diol 3-propionate, 17-p-toluenesulfinate.

EXAMPLE 3

A solution containing 17 parts of 17α-ethynylestra-1,3,5(10)-triene-3,17β-diol 3-acetate, 7.9 parts of pyridine and 667 parts of methylene chloride is cooled by means of a Dry Ice-acetone bath and 9.65 parts of p-toluenesulfinyl chloride is added with stirring over a period of about 10 minutes. The reaction mixture is stirred at that temperature for about 4 hours, then is allowed to warm to a temperature of approximately 4° over a period of about 16 hours. At the end of that time the mixture is washed successively with cold dilute hydrochloric acid, water, cold dilute aqueous sodium carbonate, water and saturated aqueous sodium chloride, then is dried over anhydrous sodium sulfate and distilled to dryness under reduced pressure. The resulting solid residue is purified by recrystallization from acetone-hexane to yield pure 17α-ethynylestra-1,3,5,(10)-triene-3,17β-diol 3-acetate, 17-p-toluenesulfinate, melting at about 151–154°. This compound exhibits infrared absorption peaks at about 3.02, 5.70, 6.25, 6.68, 7.28, 8.10, 8.85, 9.85 and 10.40 microns and nuclear magnetic resonance peaks at about 52, 57, 136, 145.5, 180, 425 and 450.5 cycles per second. It is characterized further by the following structural formula.

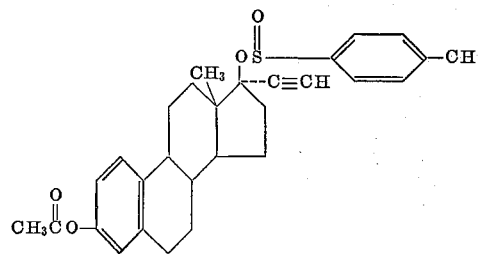

EXAMPLE 4

The substitution of an equivalent quantity of 17α-ethynylestra-1,3,5(10)-triene-3,17β-diol 3-propionate in the procedure of Example 3 results in 17α-ethynylestra-1,3,5 (10)-triene-3,17β-diol 3-propionate, 17-p-toluenesulfinate.

EXAMPLE 5

A solution containing 11.6 parts of 17α-ethynyl-5α-androstane-3β,17β-diol 3-acetate, 2.6 parts of pyridine and 667 parts of methylene chloride is cooled to about —20°, at which time 4 parts of methanesulfinyl chloride is added with stirring over a period of about 3 minutes. The resulting reaction mixture is stirred and cooled for about 2 hours, then is washed successively with cold dilute hydrochloric acid, water, aqueous sodium carbonate, water and saturated aqueous sodium chloride. The washed solution is dried over anhydrous sodium sulfate and concentrated under reduced pressure to afford 17α-ethynyl-5α-androstane-3β,17β-diol 3-acetate, 17-methanesulfinate, melting at about 139–140°. Infrared absorption maxima, in chloroform, are observed at about 3.00, 5.76, 7.90, 8.32 and 9.72 microns. Nuclear magnetic resonance peaks are observed at about 50, 52, 53.5, 120.5, 158, 170.5, 172 and 282 cycles per second. This compound is represented by the following structural formula

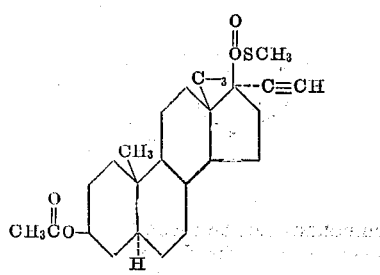

EXAMPLE 6

To a solution of 20 parts of 17α-ethynylestra-1,3,5(10)-triene-3,17β-diol 3-methyl ether and 6.4 parts of pyridine in 800 parts of methylene chloride is added, at about —20° with stirring, 7.56 parts of methanesulfinyl chloride. The reaction mixture is stirred and cooled for about 4½ hours, then is washed successively with cold dilute hydrochloric acid, water, aqueous sodium carbonate, water and saturated aqueous sodium chloride. The dried solution is concentrated under reduced pressure to afford, as a white crystalline solid, 17α-ethynylester-1,3,5(10-triene-3,17β-diol 3-methyl ether, 17-methanesulfinate, melting with decomposition at about 142–155°. This compound exhibits infrared absorption maxima, in chloroform, at about 3.00, 6.19, 6.62, 7.92 and 8.87 microns and nuclear magnetic resonance signals at about 55.5, 57, 162, 173, 175, 229, 402 and 422 (quartet) cycles per second. It is repersented by the following structural formula

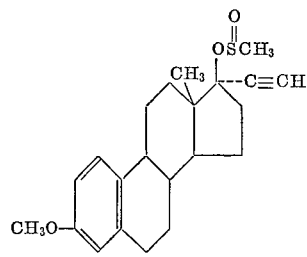

EXAMPLE 7

To a solution of 9.65 parts of 17α-ethynylestra-1,3,5 (10)-triene-3,17β-diol 3-acetate and 3.2 parts of pyridine in 400 parts of methylene chloride is added, at approximately —20° with stirring, 3.37 parts of methanesulfinyl chloride. The resulting reaction mixture is stirred and cooled for about 16 hours, then is washed successively with cold dilute hydrochloric acid, water, aqueous sodium carbonate, water and saturated aqueous sodium chloride. The resulting reaction mixture is dried over anhydrous sodium sulfate, then is concentrated under reduced pressure to afford, as a pale yellow syrup, 17α-ethynylestra-1,3,5,(10)-triene-3,17β-diol 3-acetate, 17-methanesulfinate. This compound exhibits infrared absorption maxima at about 3.00, 5.69, 6.67, 8.10 and 8.30 microns and nuclear magnetic resonance peaks at about 55, 56, 137, 160.5, 172.5, 174 and 425 (qartet) cycles per second. It is represented by the following structural formula

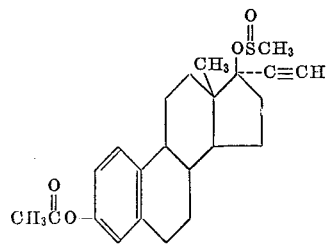

EXAMPLE 8

The substitution of an equivalent quantity of 17α-ethynylestra - 1,3,5(10) - triene - 3,17β - diol 3-ethyl ether in the procedure of Example 6 results in 17α-ethynylestra-1,3,5(10)-triene - 3,17β-diol 3-ethyl ether, 17-methanesulfinate.

EXAMPLE 9

A solution containing 7.8 parts of 17α-ethynylestra-1,3,5(10)-triene - 3,17β - diol 3-methyl ether, 10 parts of pyridine and 333 parts of methylene chloride is cooled by means of an ice-salt bath and 4.83 parts of p-toluenesulfinyl chloride is added with stirring over a period of about 15 minutes. The reaction mixture is stored at approximately 4° for about 18 hours, then is washed successively with cold dilute hydrochloric acid, cold dilute aqueous sodium bicarbonate and saturated aqueous sodium chloride. The organic solution is then dried over anhydrous sodium sulfate and stripped of solvent by distillation under reduced pressure to afford 17α-ethynylestra-1,3,5(10)-triene-3,17β-diol 3-methyl ether, 17-p-toluenesulfinate as a colorless glass. This compound exhibits infrared absorption maxima at about 3.01, 6.21, 6.65, 8.89, 9.00 and 10.39 microns, nuclear magnetic resonance peaks at about 53.5, 56.5, 145, 177, 179, 226 and 399–465 (multiplet) cycles per second and is characterized further by the following structural formula

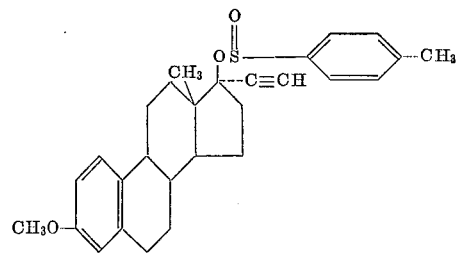

EXAMPLE 10

A solution containing 23 parts of 17α-ethynyl-5α-androstane-3β,17β-diol 3-acetate, 17-p-toluenesulfinate and 880 parts of chlorobenzene is heated at the reflux temperature in a nitrogen atmosphere for about 45 minutes, then is concentrated to dryness under reduced pressure. The resulting crude product is purified by recrystallization from acetone to afford dense prism-like crystals of 21β-p-tolylsulfonyl - 5α - pregna-17(20)-dien-3β-ol 3-acetate, melting at about 191–197°. Nuclear magnetic resonance peaks are observed at about 50, 52.5, 146.5, 282, 374 and 450 cycles per second, infrared absorption maxima at about 5.11, 5.72, 6.19, 7.53, 7.95, 8.70, 9.19 and 9.72 microns and an ultraviolet absorption maximum at about 236 millimicrons with a molecular extinction coefficient of about 17,900. This compound is represented by the following structural formula

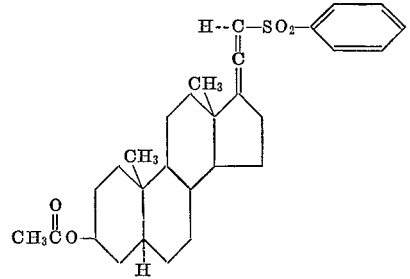

EXAMPLE 11

When an equivalent quantity of 17α-ethynyl-5α-androstane-3β,17β-diol 3-propionate, 17-p-toluenesulfinate is substituted in the procedure of Example 10, there is produced 21β-p-tolylsulfonyl - 5α-pregna-17(20),20-dien-3β-ol 3-propionate.

EXAMPLE 12

A solution of 22.2 parts of 17α-ethynylestra-1,3,5(10)-triene-3,17β-diol 3-methyl ether, 17-methanesulfinate in 867 parts of chlorobenzene is heated at the reflux temperature in a nitrogen atmosphere for about 75 minutes, then is concentrated to dryness under reduced pressure. The resulting solid residue is purified by recrystallization from acetone-methylcyclohexane to afford, as long needle-like crystals, 21β-methanesulfonyl - 19 - norpregna-1,3, 5(10),17(20),20-pentaen-3-ol 3-methyl ether, melting at about 158–160°. This compound displays an optical rotation, in chloroform, of +179°. Infrared absorption peaks are observed, in chloroform, at about 5.10, 6.21, 6.35, 7.59, 8.11, 8.83 and 10.41 microns. Nuclear magnetic resonance signals are observed at about 63.5, 178.5, 225, 375 (triplet), 399 and 418 (quartet) cycles per second.

This compound is represented by the following structural formula

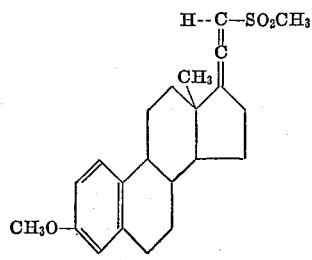

EXAMPLE 13

By substituting an equivalent quantity of 17α-ethynyl-estra - 1,3,5(10 - triene - 3,17β - diol 3-ethyl ether, 17-methanesulfinate and otherwise proceeding according to the processes described in Example 12, there is produced 21β-methanesulfonyl - 19 - norpregna-1,3,5(10),17(20), 20-pentaen-3-ol 3-ethyl ether.

EXAMPLE 14

A solution containing 11.2 parts of 17α-ethynylestra-1,3,5(10) - triene - 3,17β - diol 3-methyl ether, 17-p-toluenesulfinate and 220 parts of chlorobenzene is heated at the reflux temperature for about 30 minutes, then is concentrated to dryness under reduced pressure. The resulting solid residue is purified by recrystallization from ether to afford prism-like crystals of 21β-p-tolylsulfonyl-19 - norpregna - 1,3,5(10),17(20),20 - pentaen - 3 - ol 3-methyl ether, melting at about 141–143°. This compound displays an optical rotation of +165° and an ultraviolet absorption maximum at about 231.5 millicicrons with a molecular extinction coefficient of about 21,800. Nuclear magnetic resonance peaks are observed at about 55, 146.5, 225, 376, 398, 418 and 455 cycles per second and infrared absorption maxima at about 5.10, 6.22, 6.35, 6.65, 7.59, 7.65, 7.75, 8.75 and 9.23 microns. This compound is represented by the following structural formula

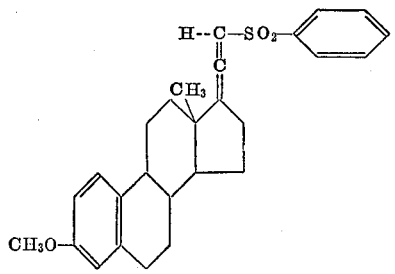

EXAMPLE 15

A solution of 23 parts of 17α-ethynylestra-1,3,5(10)-triene - 3,17β - diol 3-acetate, 17-p-toluenesulfinate and 770 parts of chlorobenzene is heated at the reflux temperature under nitrogen for about 45 minutes, then is concentrated to dryness under reduced pressure to afford, as a glass, 21β - p - tolylsulfonyl - 19 - norpregna-1,3,5(10),17(20),20 - pentaen-3-ol 3-acetate. This compound displays infrared absorption maxima at about 5.10, 5.70, 6.25, 6.68, 7.58, 7.65, 8.10, 8.73, 9.23 and 9.84 microns and nuclear magnetic resonance peaks at about 55, 136, 147, 378, 424 and 456 cycles per second. It is represented by the following structural formula

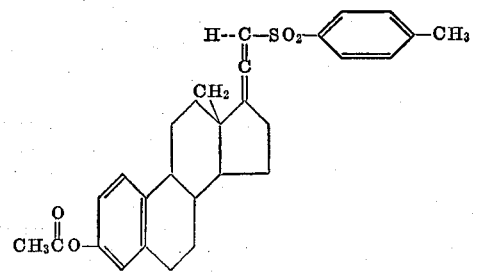

EXAMPLE 16

A solution containing 23 parts of 21β-p-tolylsulfonyl-19 - norpregna - 1,3,5(10),17(20),20 - pentaen - 3 - ol acetate, 21 parts of acetic acid, 80 parts of methanol and 5 parts of water is distilled slowly over a period of about 3 hours, during which time the volume is maintained by the periodic addition of methanol. At the end of that reaction period the solvents are removed by distillation under reduced pressure and the resulting residue is extracted with ether. The ether solution is washed successively with dilute aqueous sodium bicarbonate, water and saturated aqueous sodium chloride, then is dried over anhydrous sodium sulfate. The dried solution is concentrated to dryness under reduced pressure and the crude product thus obtained is purified by recrystallization first from ether-hexane, then from ethyl acetate-methylcyclohexane to yield needle-like crystals of 21β-p-tolylsulfonyl-19 - norpregna - 1,3,5(10),17(20),20 - pentaen - 3 - ol, melting at about 192.5–194°. Nuclear magnetic resonance peaks are observed at about 53.5, 145.5, 340.5, 376,5, 412 and 454 cycles per second and infrared absorption peaks at about 2.78, 3.11, 5.10, 6.64, 7.59, 7.65, 7.75, 8.73 and 9.23 microns. It is represented by the following structural formula

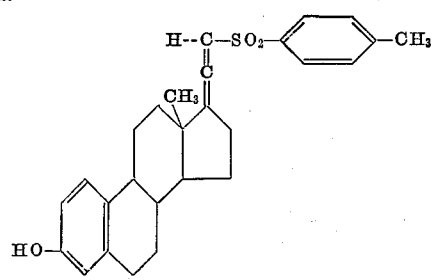

EXAMPLE 17

A solution of 11.4 parts of 17α - ethylnylestra - 1,3, 5(10) - triene - 3,17β - diol 3 - acetate, 17 - methanesulfinate in 267 parts of chlorobenzene is heated in a nitrogen atmosphere at the reflux temperature for about one hour, then is concentrated to dryness under reduced pressure. The resulting gummy residue is purified by recrystallization from acetone-methylcyclohexane to afford prism-like crystals of 21β-methanesulfonyl - 19 - norpregna - 1,3,5(10),17(20),20-pentaen-3-ol acetate, melting at about 146–148°. It displays an optical roation, in chloroform, of +160°. Infrared absorption maxima, in chloroform, are observed at about 5.09, 5.65, 5.70, 7.60, 8.15, 8.83, 9.85 and 10.41 microns and nuclear magnetic resonance signals are displayed at about 63.5, 135, 178, 375 (triplet) and 424 (quartet) cycles per second. This compound is characterized further by the following structural formula

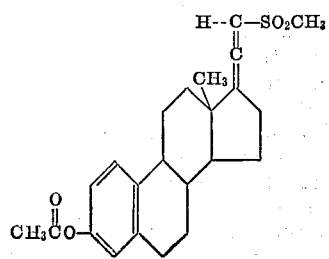

EXAMPLE 18

To a solution of 3 parts of 21β-methanesulfonyl-19-norpregna - 1,3,5(10),17(20),20 - pentaen - 3 - ol 3-acetate in 16 parts of methanol is added a solution of 0.03 parts of sodium carbonate in 1 part of water and the resulting reaction mixture is warmed for about 120 minutes. Cooling of the reaction mixture results in crystallization of the product, which is isolated by filtration, thus affording white needle-like crystals of 21β-methanesulfonyl - 19 - norpregna-1,3,5(10),17(20),20-pentaen-3-ol, melting at about 237.5–240.5°. This compound exhibits infrared absorption maxima, in chloroform, at about 2.76, 2.90, 5.11, 6.20, 6.31, 7.61, 8.84 and 10.41 microns and is characterized further by the following structural formula

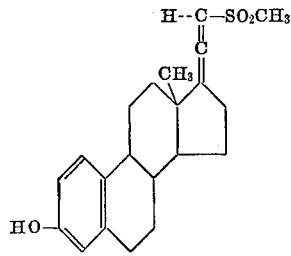

EXAMPLE 19

A solution consisting of 13.2 parts of 17α-ethynyl-5α-androstane-3β,17β-diol 3-acetate, 17-methanesulfinate in 400 parts of chlorobenzene is heated at the reflux temperature under nitrogen for about 90 minutes, then is concentrated to dryness under reduced pressure. Recrystallization of the resulting residue from ethyl acetate affords 21β - methanesulfonyl - 5α - pregna - 17(20),20 - diene-3β-ol acetate as thick white platelet-like crystals, melting at about 218–223°. Infrared absorption maxima, in chloroform, are observed at about 5.11, 5.80, 7.61, 7.92, 8.85, 9.75 and 10.41 microns. Nuclear magnetic resonance peaks are displayed at about 51, 61, 120.5, 177.5, 283 and 373 (triplet) cycles per second. This compound is represented by the following structural formula

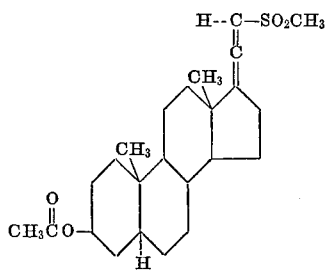

EXAMPLE 20

A mixture cntaining one part of 21β-p-tolylsulfonyl-5α-pregna-17(20),20-diene-3β-ol acetate, 0.6 part of concentrated hydrochloric acid, 40 parts of ethanol and 5 parts of water is stored at room temperature for about 16 hours, then is carefully diluted with water. The resulting precipitated product is isolated by filtration and dried, then purified by recrystallization from methylcyclohexane-acetone to afford 21β-p-tolylsulfonyl-5α-pregna-17-(20),20-dien-3β-ol, melting at about 165–170° and characterized by infrared absorption maxima, in chloroform, at about 2.75, 5.10, 6.25, 7.58, 8.75, 9.23 and 9.68 microns. This compound is represented by the following structural formula

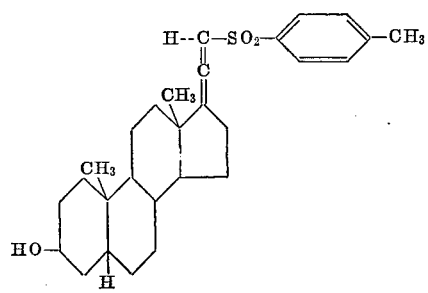

What is claimed is:
1. A compound of the formula

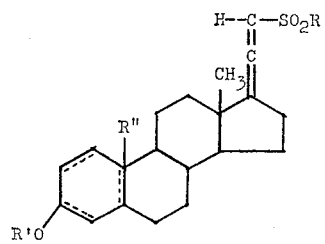

wherein R is selected from the group consisting of methyl and p-tolyl radicals, R' is a member of the class consisting of hydrogen, lower alkyl and lower alkanoyl radicals, the dotted lines indicate the A-ring to be either saturated or $\Delta^{1,3,5(10)}$-trienoic and R'' is a methyl radical when the A-ring is saturated.

2. As in claim 1, a compound of the formula

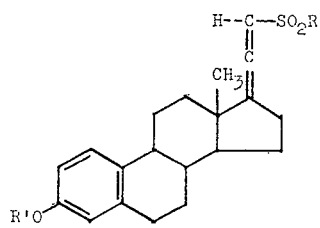

wherein R is selected from the group consisting of methyl and p-tolyl radicals and R' is a member of the class consisting of hydrogen, lower alkly and lower alkanoyl radicals.

3. As in claim 1, a compound of the formula

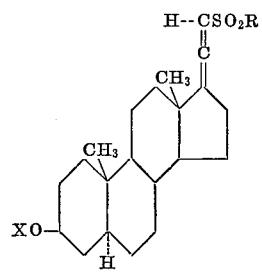

wherein R is selected from the group consisting of methyl and p-tolyl radicals and X is a member of the class consisting of hydrogen and lower alkanoyl radicals.

4. As in claim 1, the compound which is 21β-n-tolylsulfonyl-19-norpregna-1,3,5(10),17(20),20 - pentaen - 3-ol.

5. As in claim 1, the compound which is 21β-methanesulfonly - 19 - norpregna-1,3,5(10),17(20),20-pentaen-3-ol acetate.

6. As in claim 1, the compound which is 21β-methanesulfonyl-19-norpregna-1,3,5(10),17(20),20-pentaen-3-ol.

7. As in claim 1, the compound which is 21β-methanesulfonyl - 19 - norpregna-1,3,5(10),17(20),20-pentaen-3-ol methyl ether.

8. As in claim 1, the compound which is 21β-p-tolylsulfonyl-5α-pregna-17(20),20-dien-3β-ol acetate.

9. A compound of the formula

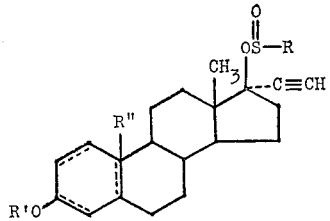

wherein R is selected from the group consisting of methyl and p-tolyl radicals, R' is a member of the class consisting of hydrogen, lower alkyl and lower alkanoyl radicals, the dotted lines indicate the A-ring to be either saturated or $\Delta^{1,3,5(10)}$-trienoic and R'' is a methyl radical when the A-ring is saturated.

10. As in claim 9, the compound which is 17α-ethynyl-5α-androstane-3β,17β-diol 3-acetate, 17-p-tolylsulfinate.

11. As in claim 9, the compound which is 17α-ethynyl-estra-1,3,5(10)-triene-3,17β-diol - 3 - acetate, 17-p-tolylsulfinate.

References Cited

UNITED STATES PATENTS 3,484,463  12/1969  Benn _____ 260—397.3

LEWIS GOTTS, Primary Examiner

E. G. LOVE, Assistant Examiner

U.S. Cl. X.R.

424—238